United States Patent [19]

Sakamoto et al.

[11] Patent Number: 5,073,746
[45] Date of Patent: Dec. 17, 1991

[54] SPEED CONTROL METHOD FOR SERVOMOTORS

[75] Inventors: Keiji Sakamoto, Hachioji; Yasusuke Iwashita, Yamanashi, both of Japan

[73] Assignee: Fanuc Ltd., Minamitsuru, Japan

[21] Appl. No.: 548,887

[22] PCT Filed: Dec. 5, 1989

[86] PCT No.: PCT/JP89/10221
§ 371 Date: Jul. 25, 1990
§ 102(e) Date: Jul. 25, 1990

[87] PCT Pub. No.: WO90/06622
PCT Pub. Date: Jun. 14, 1990

[30] Foreign Application Priority Data
Dec. 10, 1988 [JP] Japan .................. 63-311012

[51] Int. Cl.$^5$ .................. G05B 5/01
[52] U.S. Cl. .................. 318/560; 318/561; 318/603; 318/616
[58] Field of Search .............. 318/603, 605, 610, 615, 318/618, 561

[56] References Cited
U.S. PATENT DOCUMENTS

| | | | |
|---|---|---|---|
| 4,266,171 | 5/1981 | Mashimo | 318/603 |
| 4,503,374 | 3/1985 | Sakano | 318/616 |
| 4,528,491 | 7/1985 | Takeuchi et al. | 318/603 |
| 4,617,635 | 10/1986 | Shimizu | 318/571 |

Primary Examiner—William M. Shoop, Jr.
Assistant Examiner—Larry Moskowitz
Attorney, Agent, or Firm—Staas & Halsey

[57] ABSTRACT

A speed control method for a servomotor, capable of smoothly rotating the servomotor without causing pulsating rotation even when the servomotor rotates at low speeds. On the basis of the numbers of feedback pulses ($P2k(m-1)-k+1, \ldots, P2km$) detected and stored at intervals of a period ($TS/2k$) equal to a value obtained by dividing an estimated speed calculation period (TS) by an integer multiple of 2, the number (A) of feedback pulses in each estimated speed calculation period and the number (B) of pulses in a time period from a midpoint ($(m-1)TS-TS/2$) of an estimated speed calculation period immediately before each estimated speed calculation period to a midpoint ($mTS-TS/2$) of each estimated speed calculation period are calculated, and an estimated speed indicative of an actual rotation speed of the servomotor is further calculated on the basis of the thus calculated numbers (A, B) of pulses.

6 Claims, 4 Drawing Sheets

SPEED CONTROL METHOD FOR SERVOMOTORS

BACKGROUND OF THE INVENTION

1. Field of the Invention

The present invention relates to a method of controlling the speed of a servomotor, which method is capable of preventing the servomotor from generating pulsations at the time of rotating at low speeds.

2. Description of the Related Art

In various machines (such as an NC machine tool) using a servomotor as a drive source, it is known to control the rotation speed of the servomotor so as to drive an operating section of a machine (e.g., a tool table movable along the feed axis of a machine tool) at a predetermined speed. This type of machine generally comprises a servo system, which is arranged to detect an actual rotation speed of the servomotor based on a generation frequency of a feedback pulse supplied from an encoder each time the servomotor rotates through a predetermined rotation angle, and is arranged to supply a driving current to the servomotor in accordance with the deviation between the actual speed and a desired speed, to thereby rotate the servomotor at the desired speed.

Recently employed are software servo systems accommodating therein processors installed with speed control programs. A typical software servo system comprises a speed control loop section (FIG. 1), which is operable to subtract the product of an actual motor speed fb and a proportional gain k2 from an integrated value of a deviation between a speed command value VCMD and the value fb, to thereby derive a torque command Tqc. In FIG. 1, symbol 20 denotes an integration term whose transfer function is represented by k1/S (k1 indicates the integration gain). The transfer functions of the servomotor, represented by Kt and Jm, for a torque constant and inertia, respectively, are depicted in blocks 22 and 23.

In the conventional software servo system, feedback pulses supplied from the encoder are detected at intervals of a period equal to a speed control processing period, and a speed parameter (hereinafter referred to as estimated speed) indicative of the actual motor speed is derived by dividing the number of the pulses detected in one detection period by the same period. According to this detection method, however, the actual motor speed sometimes cannot be correctly represented by the estimated speed derived on the basis of the number of detected pulses.

For example, in the case that feedback pulses from an encoder, arranged to generate 10,000 pulses for each rotation of the servomotor, are detected at intervals of a period equal to a speed control processing period TS (e.g., 2 msec), 20,000 pulses are generated for each minute, i.e., two-thirds of a pulse are generated in each detection period when the servomotor is rotated at a low speed of twice per minute. In other words, one feedback pulse is detected in each of two detection periods among three successive detection periods and hence the calculated value of the estimated speed in these two detection periods is 1/TS, while no feedback pulse is detected in the remaining one period and the calculated value of the estimated speed in this period is "0" (FIG. 2). As a result, the estimated speed indicative of the actual speed fb significantly fluctuates between the value of "0" and the value of "1/TS". Therefore, according to the conventional speed control method, an error is likely to occur in the actual speed detection at the time of the low speed servomotor rotation during which a contribution of one feed back pulse to the detected number of pulses is large, and thus pulsations of the motor rotation are likely to occur. As a result, for instance, irregularities occur in the rotation of the feed axis of the machine tool driven by the servomotor, thereby causing vibration.

SUMMARY OF THE INVENTION

An object of the present invention is to provide a speed control method for a servomotor, which method is capable of smoothly rotating the servomotor, without causing pulsations of the motor rotation even when the servomotor rotates at low speeds.

To achieve the above object, according to one aspect of the present invention, there is provided a speed control method for a servomotor, which method comprises the steps of (a) detecting feedback pulses at intervals of a period equal to a value obtained by dividing an estimated speed calculation period by an integer multiple of 2, (b) storing the number of the feedback pulses detected in each of the detection periods, (c) calculating a first value indicative of the number of feedback pulses detected and stored in each of the estimated speed calculation periods, (d) calculating a second value indicative of the number of feedback pulses detected in a period from a midpoint of an estimated speed calculation period immediately before each of the estimated speed calculation periods to a midpoint of each of the estimated speed calculation periods, and (e) calculating an estimated speed indicative of an actual rotation speed of the servomotor on the basis of the first value and the second value.

According to another aspect of the present invention, there is provided a speed control method for a servomotor, which comprises the steps of (a) detecting feedback pulses at intervals of a period equal to a value obtained by dividing an estimated speed calculation period by an integer multiple of 2, (b) storing the number of the feedback pulses detected in each of the detection periods, (c) calculating a first value indicative of the number of feedback pulses detected and stored in each of the estimated speed calculation periods, (d) calculating a plurality of values indicative of the numbers of feedback pulses detected in respective periods from starting points of a plurality of detection periods included in an estimated speed calculation period immediately before each of the estimated speed calculation periods to starting points of corresponding ones of a plurality of detection periods included in each of the estimated speed calculation periods, and (e) calculating an estimated speed indicative of an actual rotation speed of the servomotor on the basis of the first value and said plurality of values.

As described above, according to the speed control methods of the present invention, the number of pulses in each of the estimated speed calculation periods, and the number of pulses in the period from the midpoint of an estimated speed calculation period immediately before each of the estimated speed calculation periods to the midpoint of each of the estimated speed calculation periods or the numbers of pulses detected in periods from the respective starting points of the detection periods included in an estimated speed calculation period immediately before each of the estimated speed calculation periods to the starting points of the corresponding detection periods included in each of the estimated speed calculation periods are calculated on the basis of the number of feedback pulses detected and stored at intervals of the period equal to the value obtained by dividing the estimated speed calculation period by an integer multiple of 2, and further an estimated speed indicative of the actual rotation speed of the servomotor is calculated on the basis of the thus calculated numbers of pulses. Accordingly, a variation in the estimated speed can be reduced even when the servomotor rotates at low speeds. As a result, nonuniformity in the servomotor rotation can be reduced, and thus, the vibration of various machine operating parts driven by the servomotor, such as a tool table, can be prevented.

DESCRIPTION OF THE PREFERRED EMBODIMENT

Figure 3:
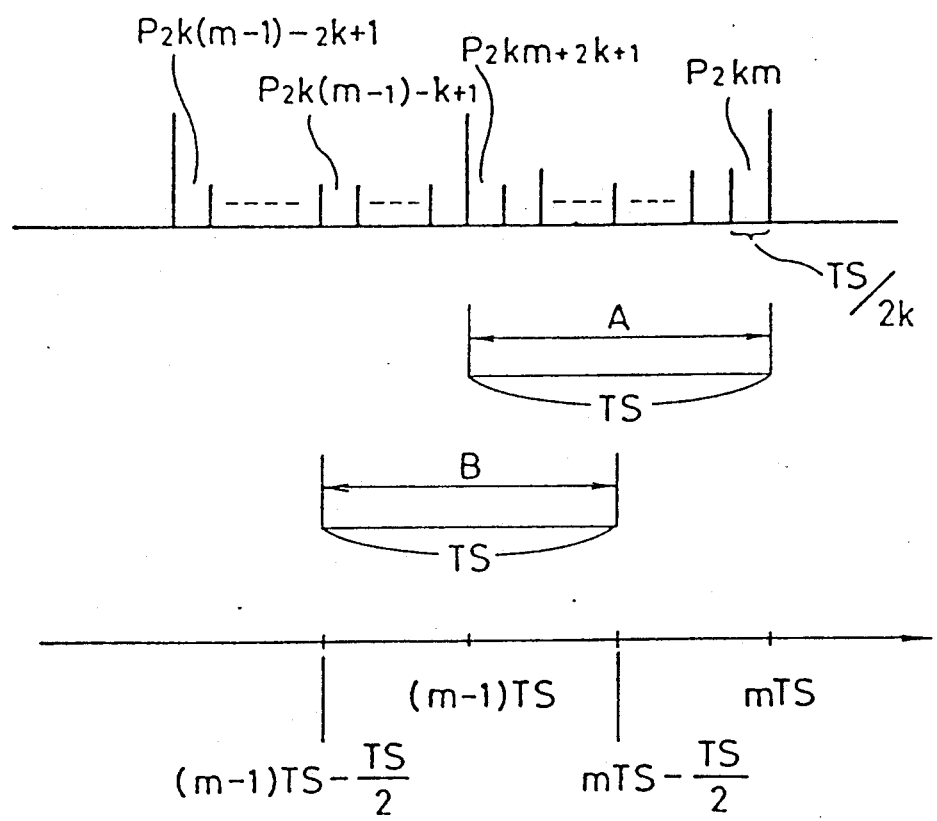
FIG. 3 is a diagram showing the operation principle of a speed control method for servomotors according to the present invention.

Referring to FIG. 3, the operation principle of a speed control method for servomotors according to the present invention will be explained.

According to the present invention, during the operation of a servomotor, an estimated speed calculation process is periodically executed in a first predetermined period (hereinafter referred to as calculation period) TS equal to a speed control processing period, and a process of detecting and storing feedback pulses is periodically executed in a second predetermined period (hereinafter referred to as detection period) TS/2k equal to a value obtained by dividing the calculation period TS by an integer multiple of 2. In each of the detection periods, the number of feedback pulses supplied from an encoder mounted on the servomotor is detected and stored.

Assuming now that the numbers of feedback pulses detected in 2k detection periods included in an m-th calculation period starting from time $(m-1)TS$ and terminating at time $mTS$ are represented by $P2km-2k+1, P2km-2k+2, \ldots, P2km$, respectively, then the total number $Am$ of feedback pulses detected in these detection periods can be represented by the following equation (1):

$$Am = \sum_{i=2km-2k+1}^{2km} Pi \qquad (1)$$

Likewise, assuming that the numbers of pulses detected in respective detection periods included in an $(m-1)$th calculation period are represented by $P2k(m-1)-2k+1, \ldots, P2k(m-1)$, then the total number $Bm$ of feedback pulses detected during a period from a midpoint $((m-1)TS-TS/2)$ in the $(m-1)$th calculation period to a midpoint $mTS-TS/2$ in the m-th calculation period can be represented by the following equation (2):

$$Bm = \sum_{i=2k(m-1)-k+1}^{2km-k} Pi \qquad (2)$$

Next, the average value of the pulse numbers Am and Bm which are derived in accordance with the above equations (1) and (2) is calculated, and an estimated speed $fb'$ indicative of an actual motor rotation speed fb is derived by dividing the average value by the calculation period TS. That is, the estimated speed $fb'$ can be represented by the following equation (3):

$$fb' = (Am + Bm)/2TS \qquad (3)$$

On the basis of the estimated speed $fb'$ calculated as described above, the speed control of the servomotor in a corresponding speed control processing period can be suitably effected.

Figure 1:
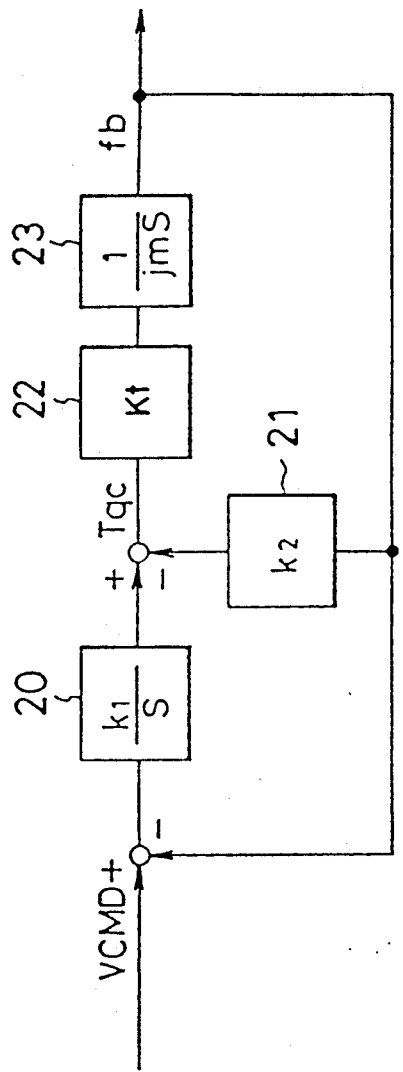
FIG. 1 is a block diagram showing, by way of example, a speed control loop section of a software servo system.
Figure 2:
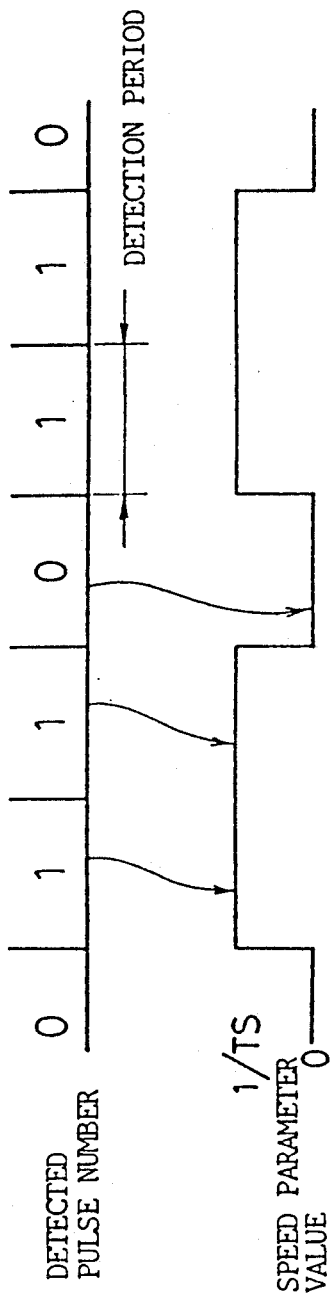
FIG. 2 is a diagram showing changes in an estimated speed with elapse of time in a conventional speed control method for servomotors.
Figure 4:
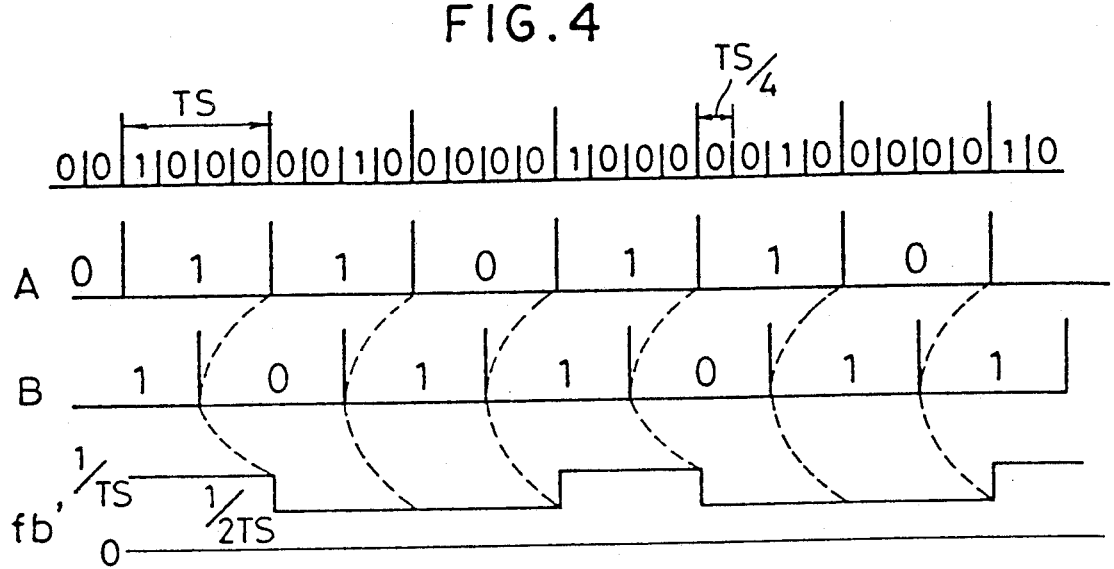
FIG. 4 is a diagram showing, by way of example, changes in an estimated speed in the method of FIG. 3.

In the following, the reasons why the speed control can be suitably carried out will be explained. Here, it is assumed that, like the conventional art explained with reference to FIGS. 1 and 2, an encoder arranged to generate 10,000 pulses for each revolution of the servomotor is employed and an estimated speed calculation process (speed control process) is executed at intervals of a period TS of 2 msec, and unlike the conventional art, the pulse detection and storage is executed at intervals of a period TS/4 of 500 μ sec which is shorter than the calculation period TS. In this case, when the servomotor rotates at a low speed of two revolutions per minute, pulses are produced at a rate of two-thirds of a feedback pulse per calculation period TS, and consequently, one-sixth of a feedback pulse per detection period (TS/2K). In other words, as shown in FIG. 4, one feedback pulse is detected every six detection periods and two in every three calculation periods. The total pulse numbers A and B in respective calculation periods, corresponding to the aforementioned values Am and Bm, vary with the elapse of time as shown in FIG. 4, namely, they take a value of "1" or "0". As a result, the estimated speed $fb'$ takes a value of "1/TS" in one of three successive calculation periods and a value of "1/2TS" in the remaining two periods. That is, the extent of variation in the estimated speed $fb'$ can be reduced, as compared with the conventional art (FIG. 2) wherein the estimated speed varies between the value "1/TS" and the value of "0". Consequently, variation in the rotation speed of the servomotor can be reduced.

In the following, the method of controlling the speed of a servomotor according to a first embodiment of the present invention will be explained, by taking an example in which the method is applied to a conventionally known software servo system mounted on an NC machine tool using a servomotor as the driving source.

Although an illustration is omitted, the software servo system comprises a processor installed with a control program, and a RAM having various registers and connected to the processor, and is arranged to execute the speed control process and estimated speed calculation process at intervals of a predetermined period and execute the current control loop process at intervals of a period shorter than the predetermined period. Further, the servo system is arranged to detect the feedback pulses supplied from the encoder mounted on the servomotor at intervals of a period equal to that for the current control loop process. The current control loop processing period, i.e., the detection period, is set to a value obtained by dividing the estimated speed calculation period (speed control processing period) by an integer multiple of 2.

Figure 5:
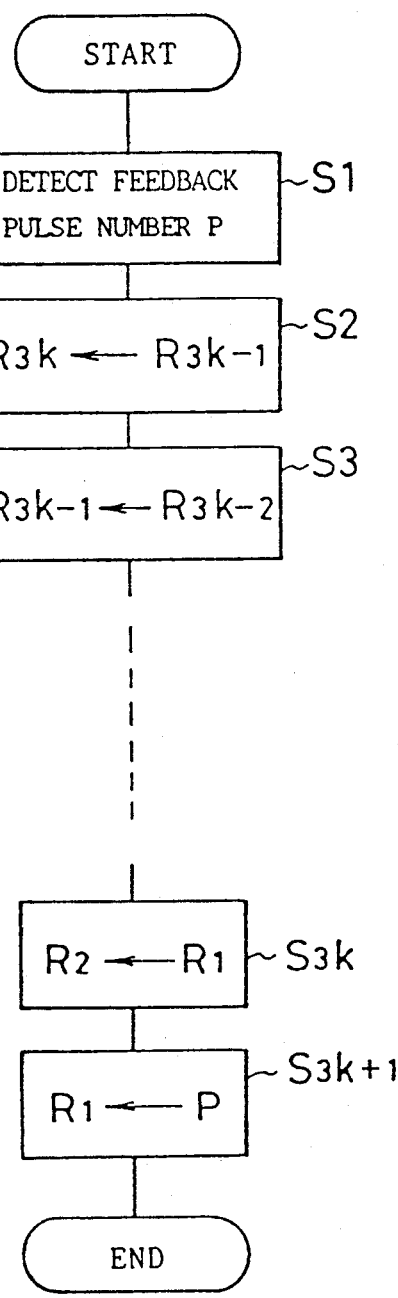
FIG. 5 is a flowchart showing a process of detecting and storing feedback pulses in a speed control method according to a first embodiment of the present invention.
Figure 6:
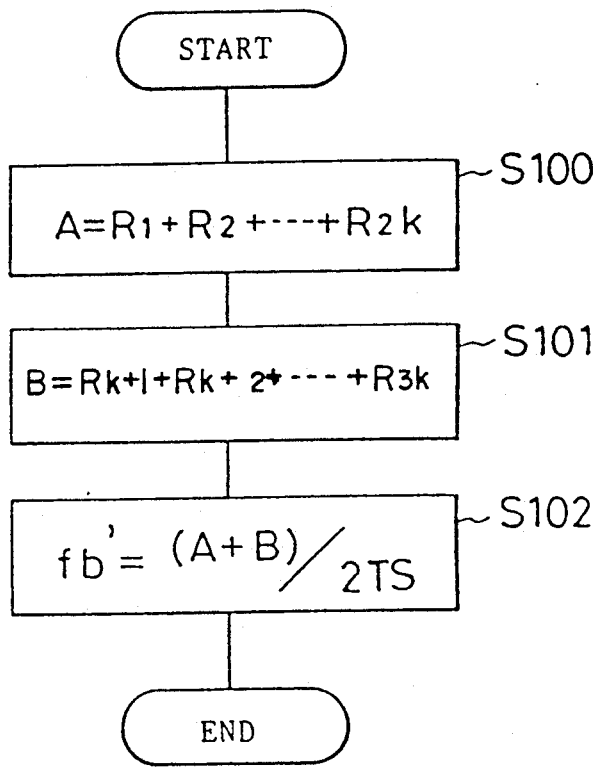
FIG. 6 is a flowchart of an estimated speed calculating process, which is executed next to the process of FIG. 5.

With reference to FIGS. 5 and 6, the operation of the software servo system will be explained.

The processor periodically executes the estimated speed calculation process of FIG. 6 at intervals of a first predetermined period (hereinafter referred to as calculation period) TS, and periodically executes the feedback pulse detection and storage process of FIG. 5 at intervals of a second predetermined period (hereinafter referred to as detection period) TS/2k, for example, TS/4.

In the detection and storage process, illustrated in FIG. 5, at first, the processor detects the number of feedback pulses generated in the present detection period (step S1). Next, the stored contents of registers R1 to R3k (e.g., six registers R1 to R6) in the RAM are updated (steps S2 to S3k+1). That is, the stored value of the register R3k−1 is stored into the register R3k (step S2), and then the stored values of the registers R3k−2 to R1 are respectively stored into the registers R3k−1 to R2 (step S3 to step S3k). Further, the number P of the pulses detected in the present detection period is stored into the register R1 (step S3k+1), and the detection and storage process for the present period is completed.

In the estimated speed calculation process, illustrated in FIG. 6, the processor adds up the stored values of the registers R1 to R2k, for example, R1 to R4 (equation (1)), to derive the total number A of the feedback pulses generated in the present calculation period (step S100). Then, the stored values in the registers Rk+1 to R3k, for example, R3 to R6, are added together (equation (2)), to derive the total number B of the pulses generated in a period from the midpoint of the preceding calculation period to the midpoint of the present calculation period (step S101). Further, the calculation shown by equation (3) is effected on the basis of the two derived values A and B, to calculate an estimated speed fb′ indicative of the actual motor speed fb (step S102), and then the estimated speed calculation process in the present period is completed.

Whereupon, the speed control process (not shown) in a process period, which starts preferably at the same time as the next estimated speed calculation process, is executed in accordance with the estimated speed fb′ calculated in the above manner. As a result, the servomotor is smoothly rotated even at the time of low-speed rotation without causing pulsating rotation, and hence vibration of the operating part of the machine tool driven by the servomotor, such as a tool table, can be suppressed.

Figure 7:
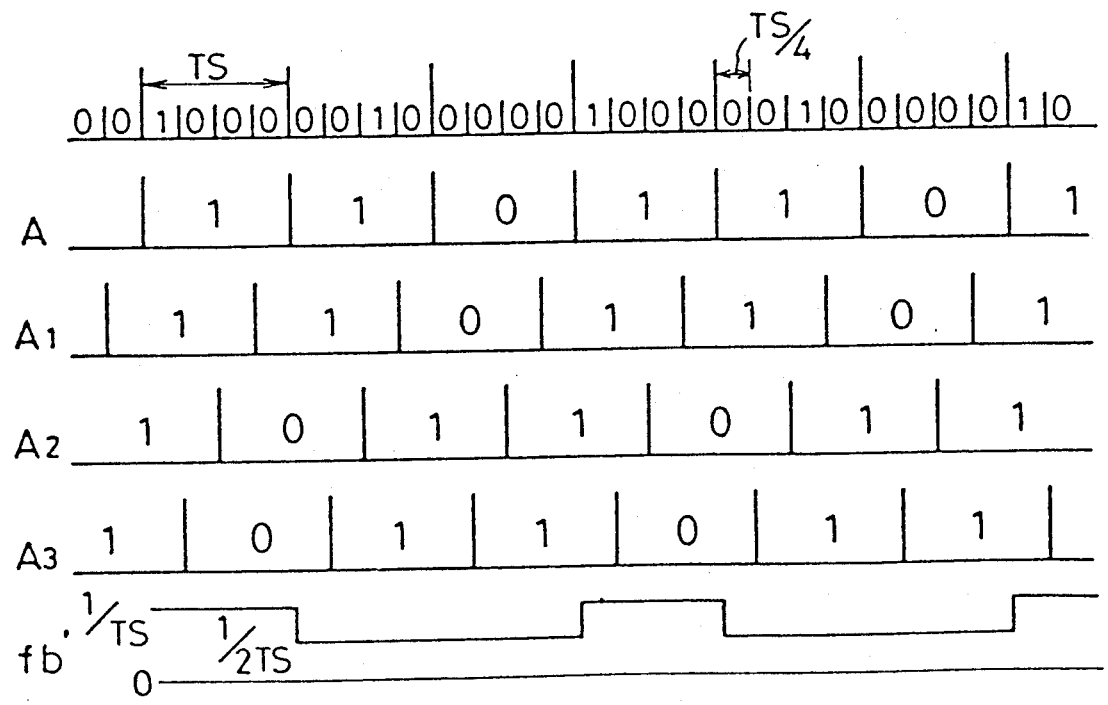
FIG. 7 is a diagram showing a speed control method according to a second embodiment of the present invention.

Referring to FIG. 7, a speed control method for a servomotor according to a second embodiment of the present invention will be explained.

As compared with the method of the first embodiment calculating the estimated speed by using the total number of pulses detected in a period from the midpoint of a calculation period immediately before each estimated speed calculation period to the midpoint of each calculation period, the method of the second embodiment is similar thereto in that the servomotor speed control can be suitably effected when applied to the conventionally known software servo system, but differs therefrom in that the second embodiment employs the total numbers of pulses which are detected within time periods from the starting points of respective detection periods contained in a previous calculation period to the starting points of corresponding detection periods contained in a present calculation period. To this end, the processor of the software servo system to which the method of the second embodiment is applied comprises registers corresponding in number to the value "4k−1", which is obtained by subtracting the value of "1" from the product of the number "2k" of the pulse detection and storage periods included in each estimated speed calculation period and the value of "2". For example, in the case of k=2 the processor uses seven registers.

In this embodiment, the processor executes substantially the same feedback pulse detection and storage process as in the case of the first embodiment. However, a stored content updating process corresponding to that of FIG. 5 is effected not for 3k (e.g., 6) registers but for (4k−1) (e.g., 7) registers.

In each of the processing periods of the estimated speed calculation process shown in FIG. 7 which illustrates a detection period 2k=4 as does FIG. 4, the processor adds together the stored contents of the registers R1 to R4 to derive the total number A of pulses detected in the present period. Further, the processor adds together the stored contents of the registers R2 to R5, to derive the total number A1 of pulses detected in a time period from the starting point of the fourth (of four) detection period included in the preceding calculation period to the starting point of the fourth detection period included in the present calculation period. The processor further adds together the stored contents of the registers R3 to R6 to derive the total number A2 of pulses detected in a time period from the starting point of the third detection period included in the preceding calculation period to the starting point of the third detection period, i.e., through the end of the second detection period, included in the present calculation period, and adds together the stored contents of the registers R4 to R7 to derive the total number A3 of pulses detected in a time period from the starting point of the second detection period included in the preceding calculation period to the starting point of the second detection period included in the present calculation period. Then, the processor derives an estimated speed fb′ for the present period by dividing the average value of the total pulse numbers A to A3 by the calculation period TS.

As is clearly seen from FIG. 7, the estimated speed fb′ varies with the elapse of time in the same manner as in the case of the first embodiment shown in FIG. 4. However, generally, the estimated speed change maybe different between the first embodiment and the second embodiment, depending upon the actual speed of the motor and the value of k.

What is claimed is:

1. A speed control method for a servomotor, comprising the steps of:
   (a) detecting feedback pulses at first intervals of a detection period equal to a value obtained by dividing an estimated speed calculation period by an integer multiple of 2;
   (b) storing a first number of the feedback pulses detected in each of the first intervals of the detection period;
   (c) calculating a first value indicative of a second number of feedback pulses detected and stored in a second interval corresponding to the estimated speed calculation period;
   (d) calculating a second value indicative of a third number of feedback pulses detected in a third interval from a midpoint of an estimated speed calculation period immediately before the estimated speed calculation period corresponding to the second interval to a midpoint of the estimated speed calculation period; and
   (e) calculating an estimated speed indicative of an actual rotation speed of the servomotor based upon the first value and the second value.

2. A speed control method according to claim 1, wherein said calculating in step (e) produces the estimated speed by summing the first and second values and dividing by two to produce an average value of the first value and the second value and dividing the average value by the estimated speed calculation period.

3. A speed control method for a servomotor, comprising the steps of:
   (a) detecting feedback pulses during each of a plurality of detection periods, each detection period having a length equal to a value obtained by dividing an estimated speed calculation period by an integer multiple of 2;
   (b) storing a first number of the feedback pulses detected in each of the detection periods;
   (c) calculating a first value indicative of a second number of the feedback pulses detected and stored in each of consecutive intervals of the estimated speed calculation period;
   (d) calculating a plurality of second values indicative of third numbers of feedback pulses detected in overlapping intervals, each starting with one of the detection periods and ending with a corresponding detection period to have a length equal to the estimated speed calculation period while overlapping a pair of the consecutive intervals; and
   (e) calculating an estimated speed indicative of an actual rotation speed of the servomotor based upon the first value and the second values for each of the consecutive intervals.

4. A speed control method according to claim 3, wherein said calculating in step (e) produces the estimated speed from an average of the first value and second values divided by the estimated speed calculation period.

5. An apparatus for determining an estimated speed of a motor, comprising:
   a detector to produce a pulse count representative of an amount of movement during each of a plurality of detection periods, and
   an estimated speed calculator to calculate the estimated speed of the motor during each of a plurality of consecutive intervals, each having a length equal to a speed calculation period and including an integral number of multiple detection periods, the estimated speed being calculated using a sum of the pulse count in the detection periods included in one of the consecutive intervals and in at least one preceding and overlapping interval having a length equal to the speed calculation period.

6. A method for determining an estimated speed of a motor, comprising the steps of:
   (a) producing a pulse count representative of an amount of movement of the motor during each of a plurality of detection periods;
   (b) summing the pulse count produced in step (a) for each of a plurality of consecutive intervals, each having a length equal to a speed calculation period including an integral number of multiple detection periods, to produce a current interval sum for each consecutive interval;
   (c) summing the pulse count produced in step (a) for each of at least one preceding interval overlapping a corresponding one of the consecutive intervals to produce an overlapping interval sum for a number of the preceding intervals; and
   (d) producing the estimated speed corresponding to each of the consecutive intervals by adding the current interval sum to the overlapping interval sum for each of the preceding intervals corresponding thereto, to produce a result and dividing the result by the speed calculation period times one plus the number of preceding intervals used to produce the overlapping interval sum.

* * * * *